United States Patent [19]

Bondurant et al.

[11] 4,282,581

[45] Aug. 4, 1981

[54] AUTOMATIC OVERFLOW/IMMINENT OVERFLOW DETECTOR

[75] Inventors: David W. Bondurant, Eden Prairie; Richard J. Martin, Rosemount, both of Minn.

[73] Assignee: Sperry Corporation, New York, N.Y.

[21] Appl. No.: 85,165

[22] Filed: Oct. 15, 1979

[51] Int. Cl.³ .................................................. G06F 11/00
[52] U.S. Cl. ...................................... 364/737; 364/715; 364/745
[58] Field of Search ............... 364/715, 737, 745, 754, 364/757

[56] References Cited

U.S. PATENT DOCUMENTS

| | | | |
|---|---|---|---|
| 3,016,193 | 1/1962 | Brett et al. | 364/737 |
| 3,017,090 | 1/1962 | Strachey et al. | 364/737 X |
| 3,290,493 | 12/1966 | Githens, Jr. et al. | 364/745 |
| 3,789,206 | 1/1974 | Heightley | 364/715 X |

Primary Examiner—Jerry Smith
Attorney, Agent, or Firm—Kenneth T. Grace; W. E. Cleaver; M. M. Truex

[57] ABSTRACT

An apparatus for automatically detecting overflow and imminent overflow conditions as data is transferred from an accumulator to a postscaler. As the data is output from the accumulator, the appropriateness of the predetermined scale factor to be used by the postscaler is determined. If an overflow condition will occur at the output of the postscaler, an overflow signal is generated, and the output of the postscaler is forced to $\pm 1$. If the output of the postscaler will produce data with an absolute value of greater than $\frac{1}{2}$, an imminent overflow signal is generated.

4 Claims, 19 Drawing Figures

| SIGN | DATA |
|---|---|
| $2^{11}$ | $2^{10}$ ---------- $2^0$ |

Fig. 4a

| SIGN | DATA |
|---|---|
| $2^4$ ---- $2^1$ | $2^0$ -------------------------- $2^{-22}$ |

Fig. 4b

| SIGN | DATA |
|---|---|
| $2^3$ --- $2^1$ | $2^0$ ---------------------- $2^{-15}$ |

Fig. 4c

| SIGN | DATA |
|---|---|
| $2^4$ ---- $2^1$ | $2^0$ ----- $2^{-5}$ |

Fig. 4d

| Fig. 6a | Fig. 6b | Fig. 6c |
|---|---|---|

Fig. 6

| Fig. 7a | Fig. 7b | Fig. 7c |
|---|---|---|

| PRODUCT TERM | | | | | | | | | | | | | | | | | ACTIVE LEVEL | | | | | | | |
|---|---|---|---|---|---|---|---|---|---|---|---|---|---|---|---|---|---|---|---|---|---|---|---|---|
| INPUT VARIABLE | | | | | | | | | | | | | | | | | - | L | H | H | H | L | - | L * |
| NO. | I15 | I14 | I13 | I12 | I11 | I10 | I9 | I8 | I7 | I6 | I5 | I4 | I3 | I2 | I1 | I0 | 7 | 6 | 5 | 4 | 3 | 2 | 1 | 0 |
| 0 | L | L | L | L | L | L | L | L | - | - | - | - | - | - | H | - |  | A |  | A |  |  |  | A |
| 1 | L | L | L | H | H | H | H | H | - | - | - | - | - | - | H | - |  | A |  | A |  |  |  | A |
| 2 | L | L | H | L | L | L | L | - | - | - | - | - | - | - | H | - |  | A |  | A |  |  |  | A |
| 3 | L | L | H | H | H | H | H | - | - | - | - | - | - | - | H | - |  | A |  | A |  |  |  | A |
| 4 | L | H | L | L | L | L | - | - | - | - | - | - | - | - | H | - |  | A |  | A |  |  |  | A |
| 5 | L | H | L | H | H | H | - | - | - | - | - | - | - | - | H | - |  | A |  | A |  |  |  | A |
| 6 | L | H | H | L | L | - | - | - | - | - | - | - | - | - | H | - |  | A |  | A |  |  |  | A |
| 7 | L | H | H | H | H | - | - | - | - | - | - | - | - | - | H | - |  | A |  | A |  |  |  | A |
| 8 | H | L | L | L | L | L | L | L | L | - | - | - | - | - | H | - |  | A |  | A |  |  |  | A |
| 9 | H | L | L | H | H | H | H | H | H | - | - | - | - | - | H | - |  | A |  | A |  |  |  | A |
| 10 | H | L | H | L | L | L | L | L | L | L | - | - | - | - | H | - |  | A |  | A |  |  |  | A |
| 11 | H | L | H | H | H | H | H | H | H | H | - | - | - | - | H | - |  | A |  | A |  |  |  | A |
| 12 | H | H | L | L | L | L | L | L | L | L | L | - | - | - | H | - |  | A |  | A |  |  |  | A |
| 13 | H | H | L | H | H | H | H | H | H | H | H | - | - | - | H | - |  | A |  | A |  |  |  | A |
| 14 | H | H | H | L | L | L | L | L | L | L | L | L | - | - | H | - |  | A |  | A |  |  |  | A |
| 15 | H | H | H | H | H | H | H | H | H | H | H | H | - | - | H | - |  | A |  | A |  |  |  | A |
| 16 | - | - | - | - | - | - | - | - | - | - | - | - | - | - | L | - |  | A |  | A |  |  |  | A |
| 17 | - | - | - | H | - | - | - | - | - | - | - | - | - | - | - | - |  |  | A |  |  | A |  |  |
| 18 | L | L | L | L | L | L | L | L | - | - | - | - | H | - | - | - |  |  |  |  |  | A |  |  |
| 19 | L | L | L | H | H | H | H | H | - | - | - | - | H | - | - | - |  |  |  |  |  | A |  |  |
| 20 | L | L | H | L | L | L | L | - | - | - | - | - | H | - | - | - |  |  |  |  |  | A |  |  |
| 21 | L | L | H | H | H | H | H | - | - | - | - | - | H | - | - | - |  |  |  |  |  | A |  |  |
| 22 | L | H | L | L | L | L | - | - | - | - | - | - | H | - | - | - |  |  |  |  |  | A |  |  |
| 23 | L | H | L | H | H | H | - | - | - | - | - | - | H | - | - | - |  |  |  |  |  | A |  |  |
| 24 | L | H | H | L | L | - | - | - | - | - | - | - | H | - | - | - |  |  |  |  |  | A |  |  |
| 25 | L | H | H | H | H | - | - | - | - | - | - | - | H | - | - | - |  |  |  |  |  | A |  |  |
| 26 | H | L | L | L | L | L | L | L | L | - | - | - | H | - | - | - |  |  |  |  |  | A |  |  |
| 27 | H | L | L | H | H | H | H | H | H | - | - | - | H | - | - | - |  |  |  |  |  | A |  |  |
| 28 | H | L | H | L | L | L | L | L | L | L | - | - | H | - | - | - |  |  |  |  |  | A |  |  |
| 29 | H | L | H | H | H | H | H | H | H | H | - | - | H | - | - | - |  |  |  |  |  | A |  |  |
| 30 | H | H | L | L | L | L | L | L | L | L | L | - | H | - | - | - |  |  |  |  |  | A |  |  |
| 31 | H | H | L | H | H | H | H | H | H | H | H | - | H | - | - | - |  |  |  |  |  | A |  |  |
| 32 | H | H | H | L | L | L | L | L | L | L | L | L | H | - | - | - |  |  |  |  |  | A |  |  |
| 33 | H | H | H | H | H | H | H | H | H | H | H | H | H | - | - | - |  |  |  |  |  | A |  |  |
| 34 | - | - | - | - | - | - | - | - | - | - | - | - | L | - | - | - |  |  |  |  |  | A |  |  |
| CONNECTIONS | A15 | A14 | A13 | A12 | A11 | A10 | A9 | A8 | A7 | A6 | A5 | A4 | A3 | A2 | A1 | A0 | Z7 | Z6 | Z5 | Z4 | Z3 | Z2 | Z1 | Z0 |

INPUTS | OUTPUTS

* A ⇒ ACTIVE ⇒ THE STATE SHOWN

AUTOMATIC OVERFLOW/IMMINENT OVERFLOW DETECTOR

BACKGROUND OF THE INVENTION

The present invention generally relates to arithmetic digital circuits and more specifically relates to error detection circuits.

The introduction and widespread use of large scale integrated circuit (LSI) technologies have made possible the incorporation of complex functions within a single device. As a result, many contemporary systems have performance and price characteristics which have significant advantages over previous systems but which introduce some new problems. Of most interest to the present invention is the use of LSI devices to perform complex arithmetic tasks. Because the arithmetic relationship between the inputs and outputs may be quite complex, scaling of the resultant, especially for fixed-point operations, can become difficult. Normally, the scale factor to be used in scaling the output (i.e., postscaling) is determined in advance of the actual arithmetic operation. Whereas this causes efficiency in post scaling, it does tend to cause overflow conditions.

It is very difficult and time consuming to determine the presence of an overflow condition from the data following the postscaling operation, though this approach is common in the art. It would be more desirable to check for an overflow condition before postscaling, but the problem is greatly complicated if the scale factor to be used in postscaling is a variable.

SUMMARY OF THE INVENTION

The present invention checks for an overflow condition after the arithmetic operation but before postscaling but permits the scale factor to be used in postscaling to be a variable. This is accomplished by evaluating the data prior to postscaling in light of the scale factor to be used. In this manner, it is determined whether the scale factor to be used is or is not appropriate to the postscaling of the current data. If an overflow condition will occur as a result of postscaling the present data using the present scale factor, an overflow signal is generated and the output of the postscaler is forced to $+1$ if the arithmetic sign of the unscaled number was positive and $-1$ if the arithmetic sign of the unscaled number was negative. The forcing of the postscaler output to $\pm 1$ permits subsequent arithmetic operations to use this resultant with a minimum of propagated error.

The present invention also checks for imminent overflow conditions. An imminent overflow is defined as a postscaler output whose absolute value exceeds $\frac{1}{2}$ (but not 1). A signal is generated indicating an imminent overflow which is expected to be useful in prescaling data before the next or subsequent arithmetic operations.

BRIEF DESCRIPTION OF THE DRAWINGS

FIG. 6 which comprises FIGS. 6a, 6b, and 6c, is a detailed view of IMAGINARY SHIFTER 104.

FIG. 7 which comprises FIGS. 7a, 7b, and 7c, is a detailed view of REAL SHIFTER 105.

DESCRIPTION OF THE PREFERRED EMBODIMENT

Figure 1:
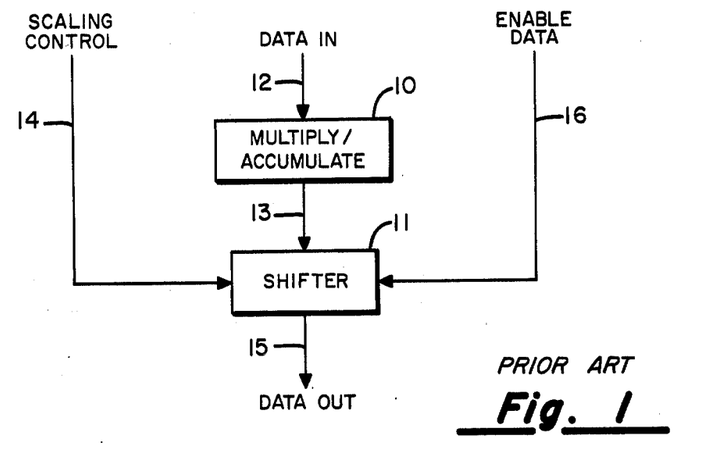
FIG. 1 shows the prior art method of postscaling data following an arithmetic operation.

FIG. 1 shows the prior art method of postscaling the resultant of an arithmetic operation. In this case, MULTIPLY/ACCUMULATE 10 performs an arithmetic operation upon the data received via line 12. The output of MULTIPLY/ACCUMULATE 10 is transferred to SHIFTER 11 for postscaling via line 13. The scale factor to be used by SHIFTER 11 is received via line 14. After postscaling, the enable data signal received via line 16 enables the output of SHIFTER 11 to be transferred via line 15.

Figure 2:
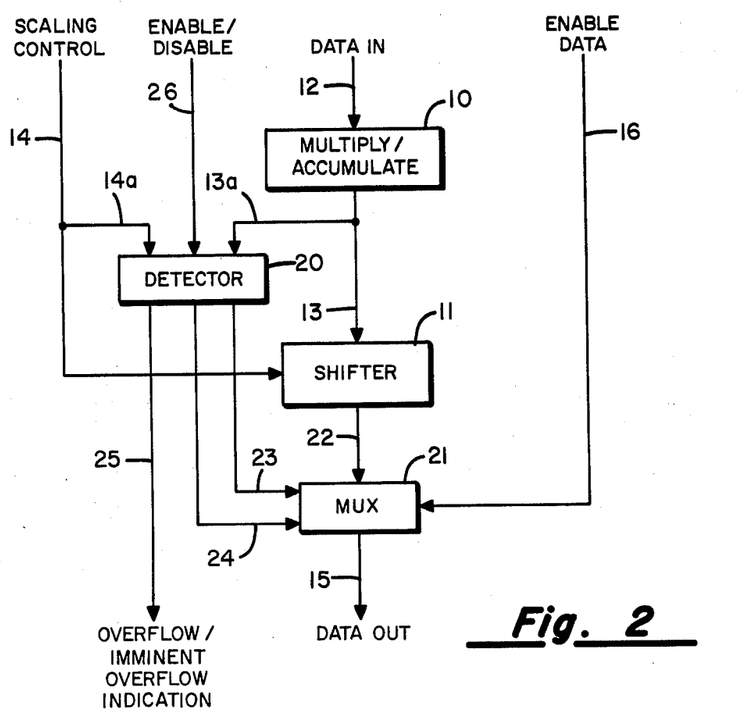
FIG. 2 shows the same postscaling method with the addition of the overflow/imminent overflow detector.

FIG. 2 shows the same elements with the addition of DETECTOR 20 and multiplexer, MUX 21. DETECTOR 20 is enabled and disabled via the control line 26 shown. When enabled, DETECTOR 20 utilizes the data received via line 13a to evaluate the appropriateness of the scale factor received via line 14a. If the output of SHIFTER 11 will be the result of an overflow or an imminent overflow (i.e., absolute value greater than $\frac{1}{2}$) condition following postscaling, DETECTOR 20 will so indicate via the appropriate signal on line 25.

DETECTOR 20 presents a $+1$ quantity signal to MUX 21 via line 23 if the arithmetic sign of the data received via line 13a is positive or presents a $-1$ quantity signal to MUX 21 via line 23 if the arithmetic sign of the data received via line 13a is negative. For non-overflow conditions, DETECTOR 20 transfers a signal via line 24 causing MUX 21 to select the data received from SHIFTER 11 via line 22 for output on line 15. If an overflow condition is detected, DETECTOR 20 transfers a signal to MUX 21 via line 24 causing MUX 21 to select the quantity (i.e., $\pm 1$) received via line 23 for output via line 15. In this manner, an overflow condition causes the DATA OUT (transferred via line 15) to be $\pm 1$ whenever an overflow condition is present. The enable data signal on line 16 is now transferred to MUX 21 cause data to be output on line 15.

Figure 3:
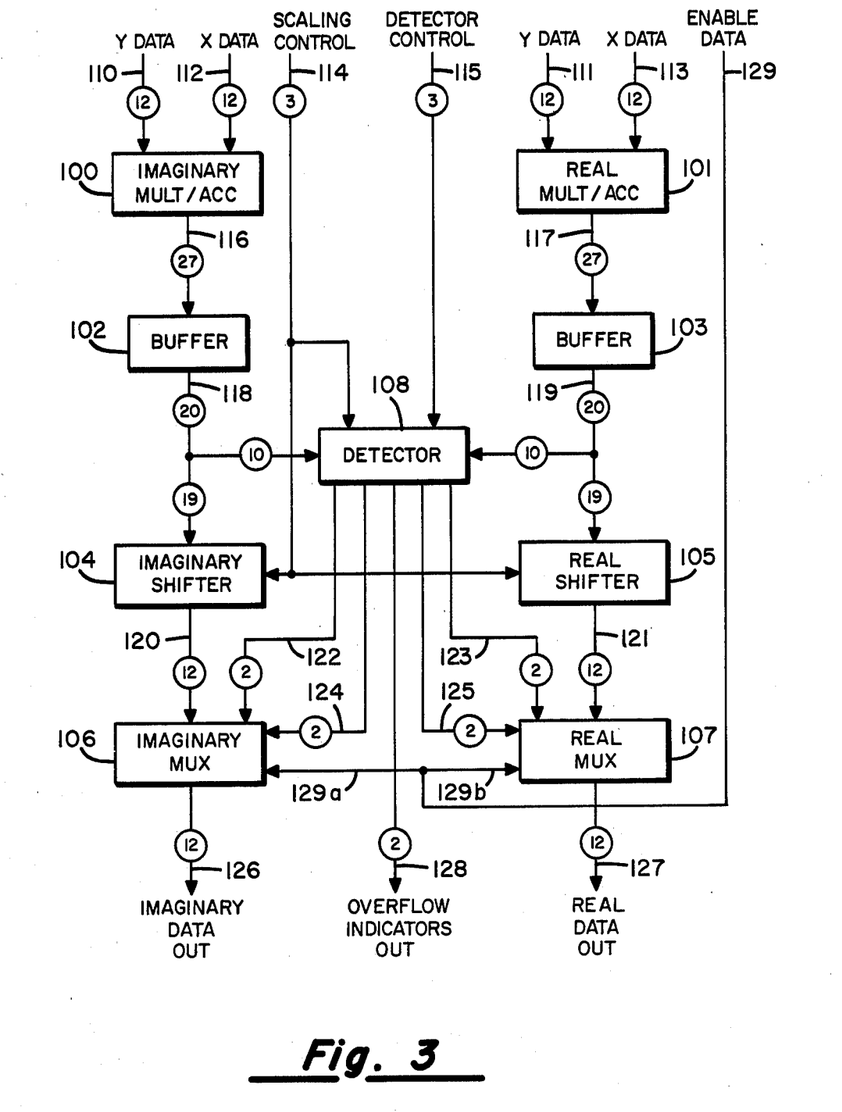
FIG. 3 shows a detailed block diagram of the preferred embodiment of the present invention.
Figure 5A:
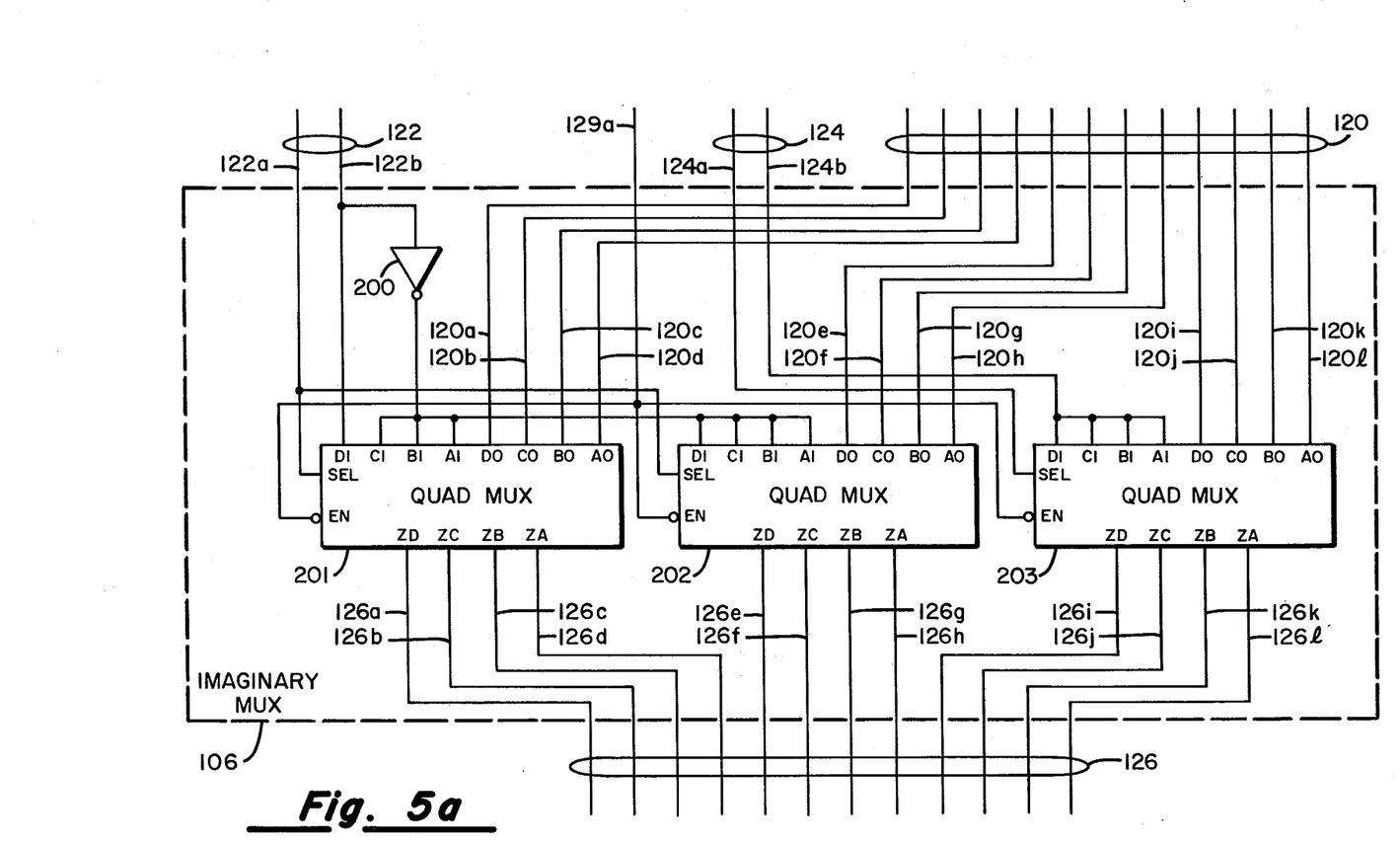
FIG. 5a is a detailed view of IMAGINARY MUX 106.
Figure 5B:
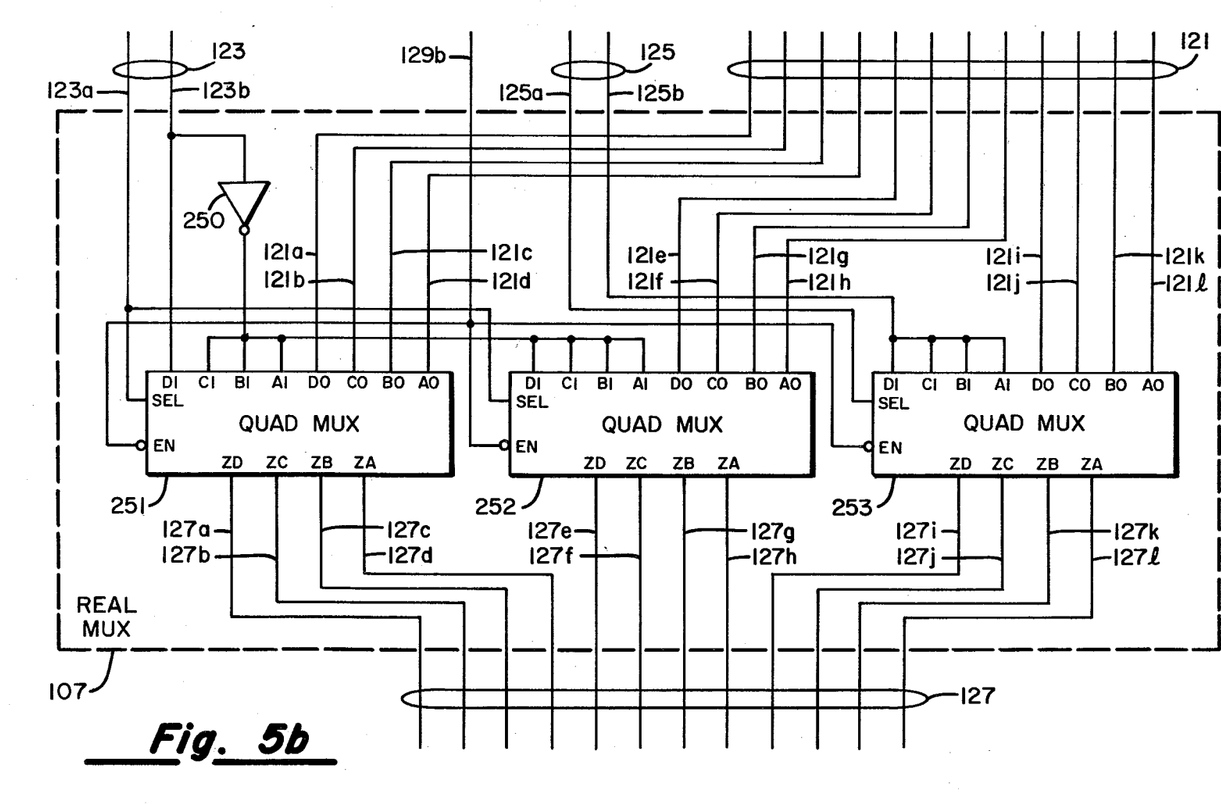
FIG. 5b is a detailed view of REAL MUX 107.
Figure 6:
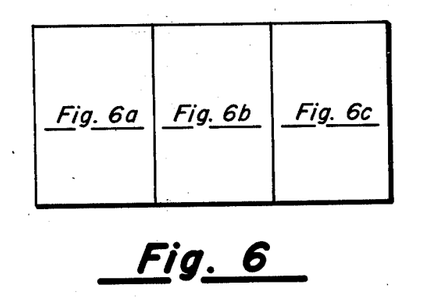
Figure 6A:
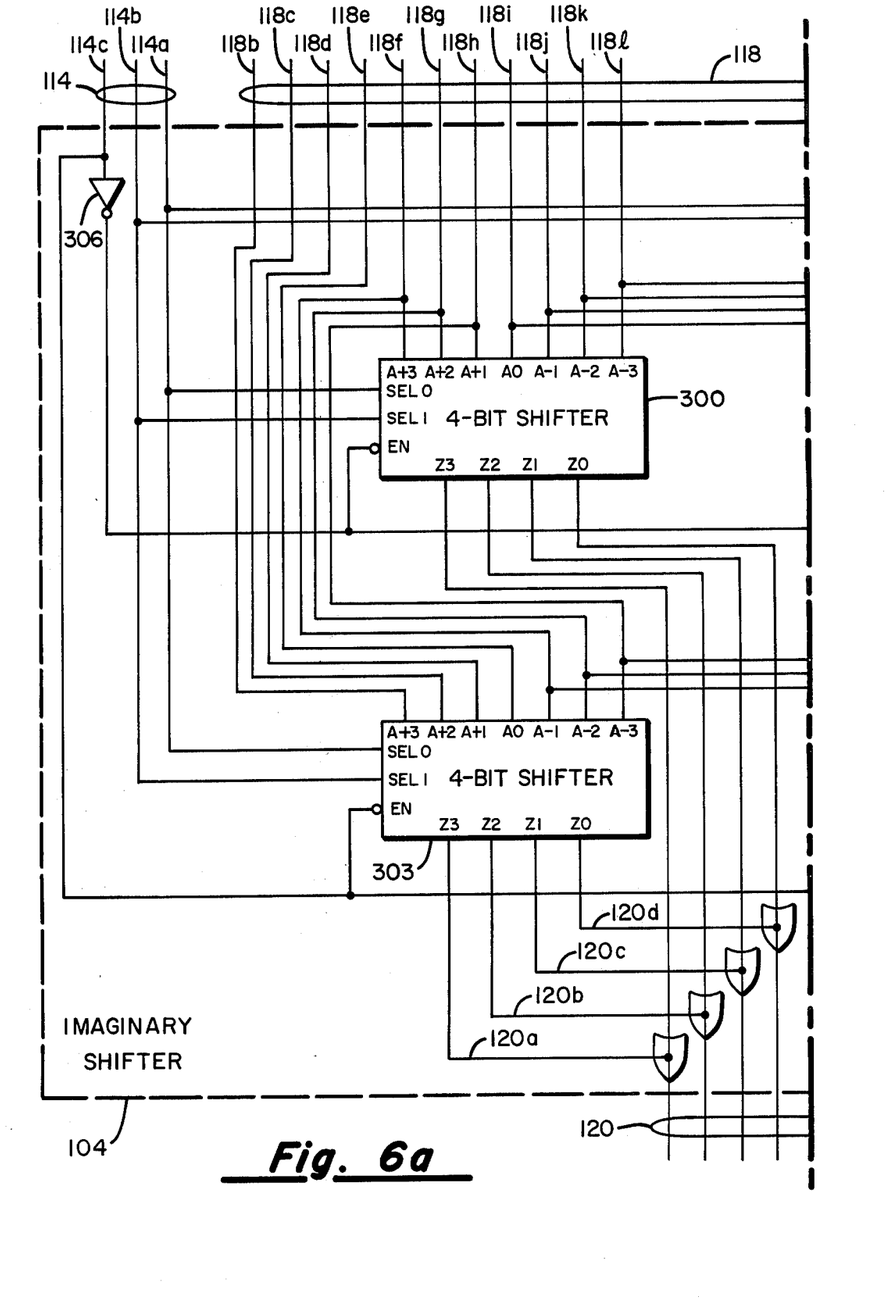
Figure 6B:
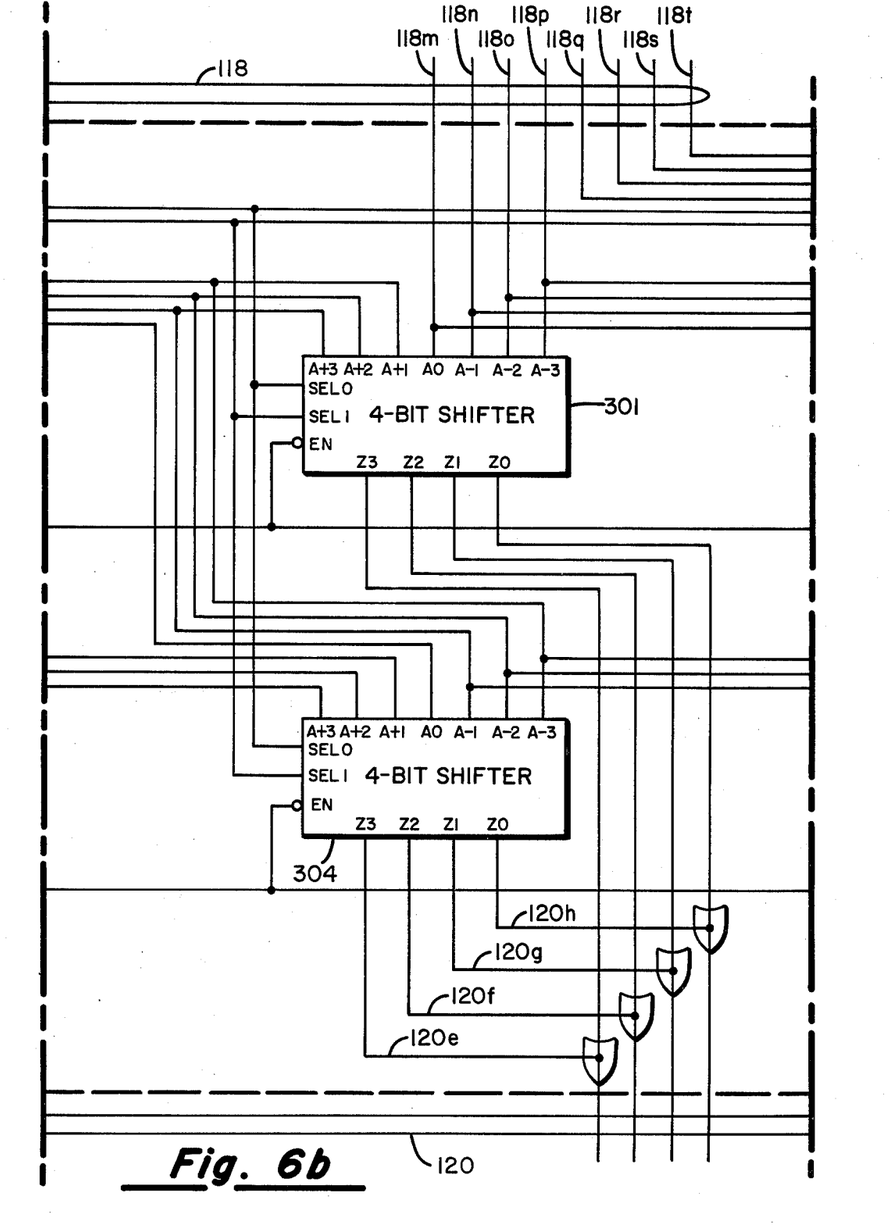
Figure 6C:
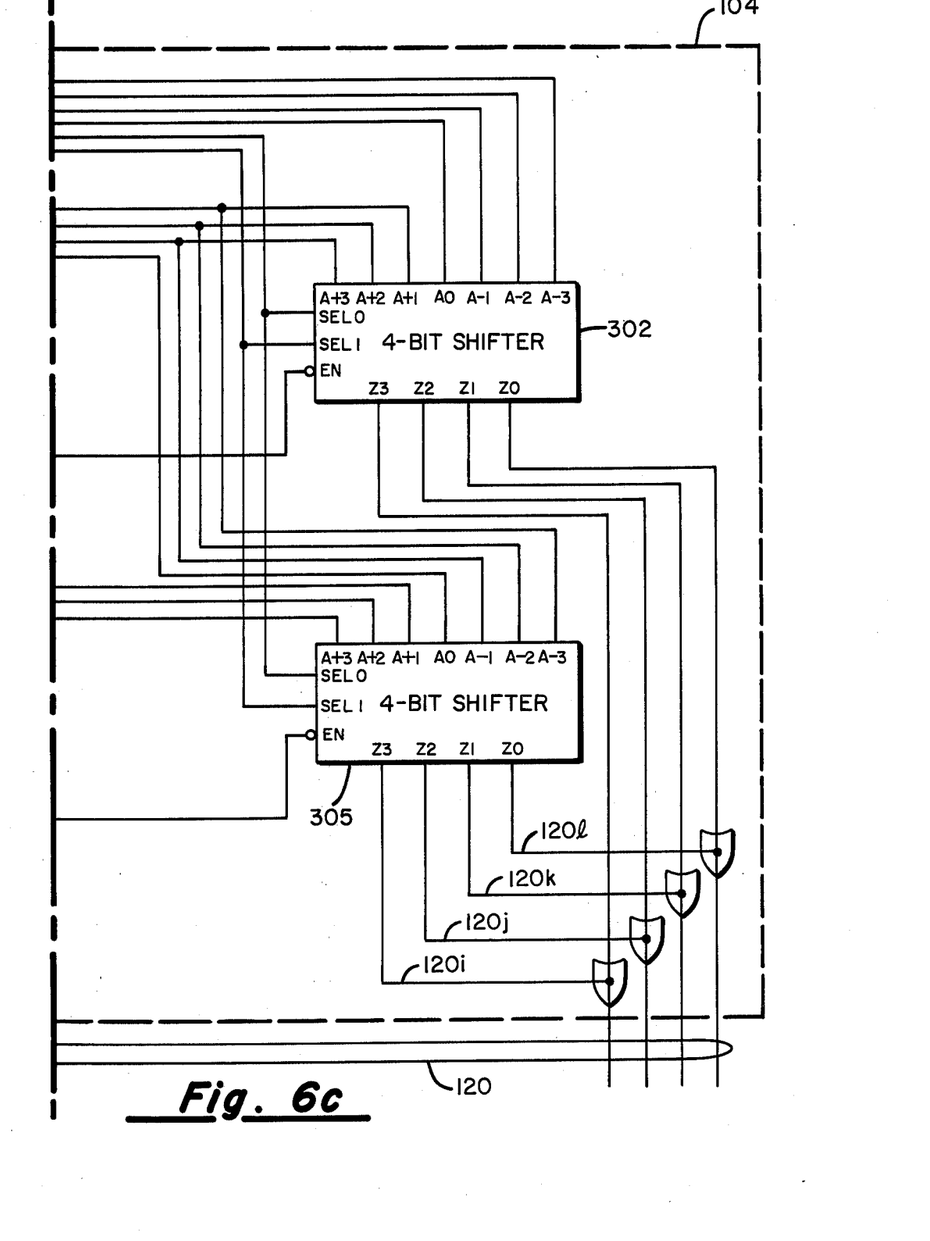
Figure 7:
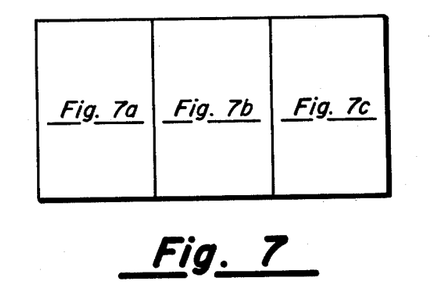
Figure 7A:
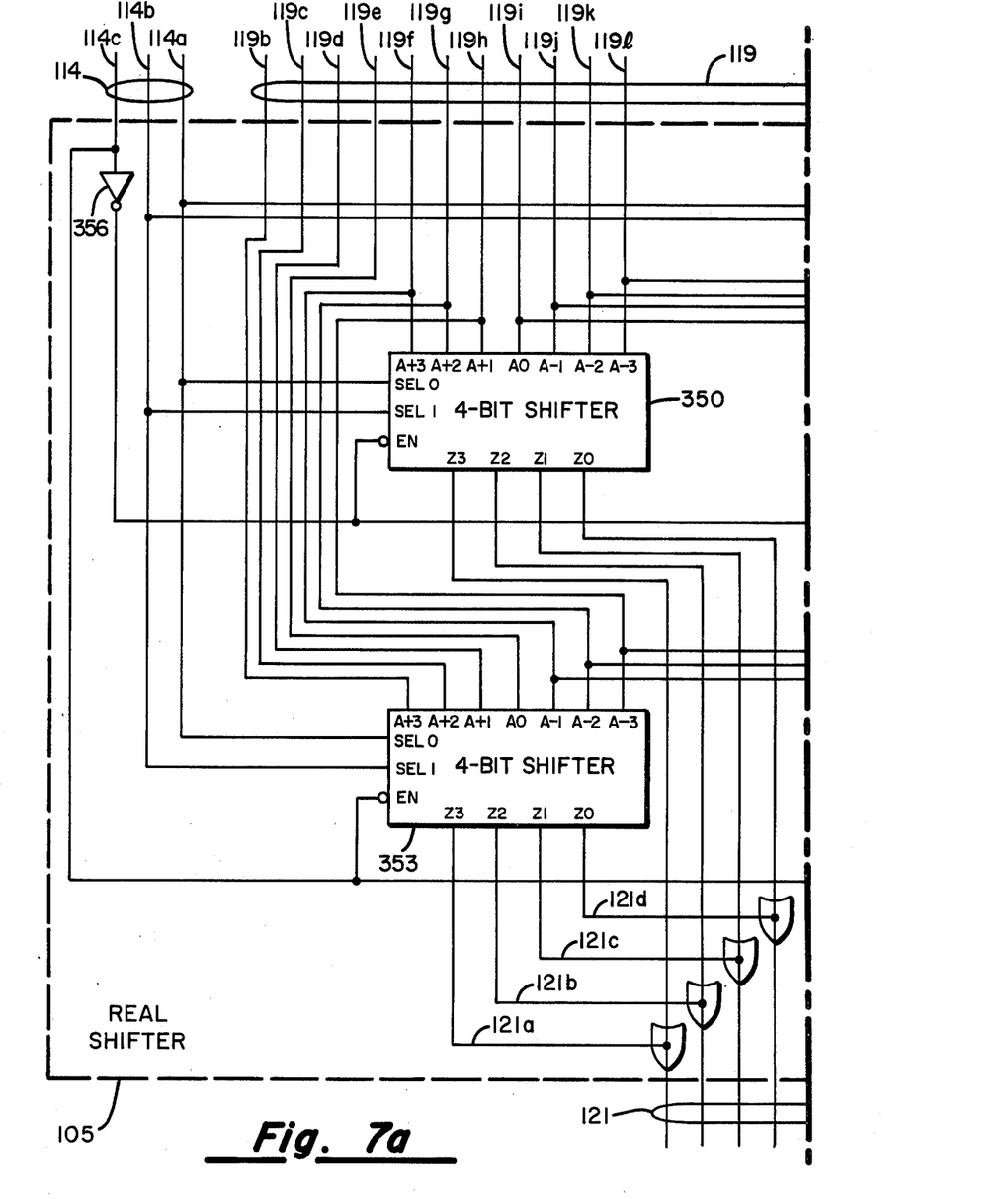
Figure 7B:
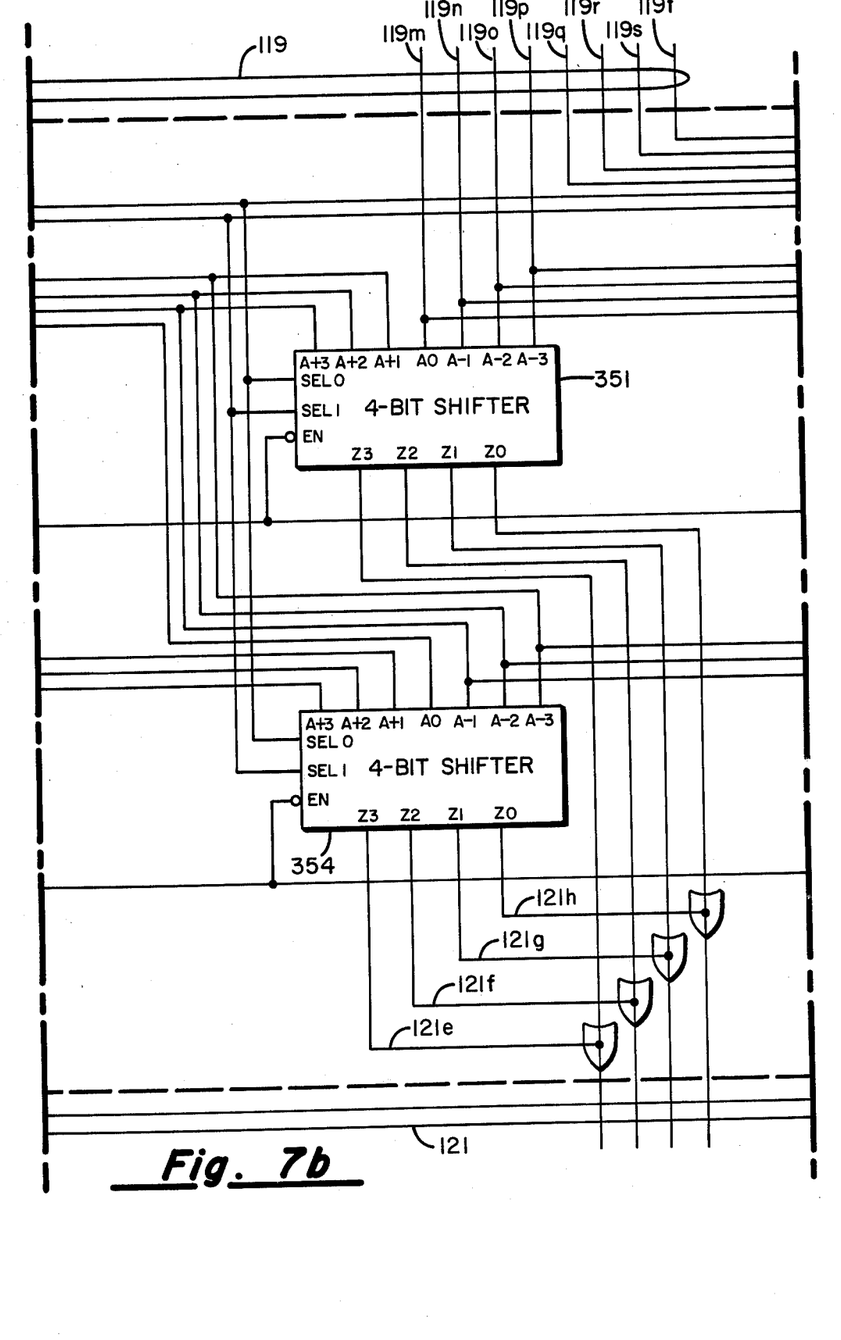
Figure 7C:
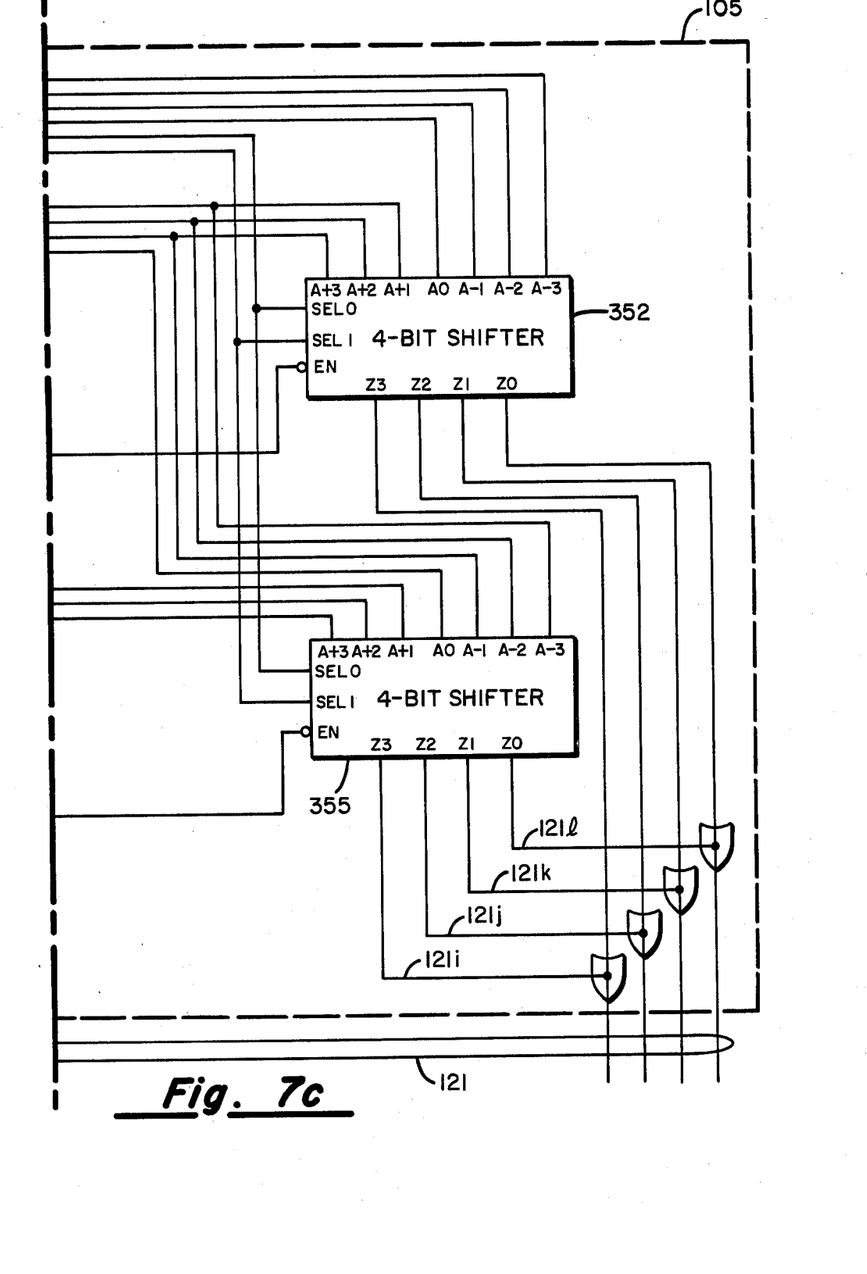
Figure 8:
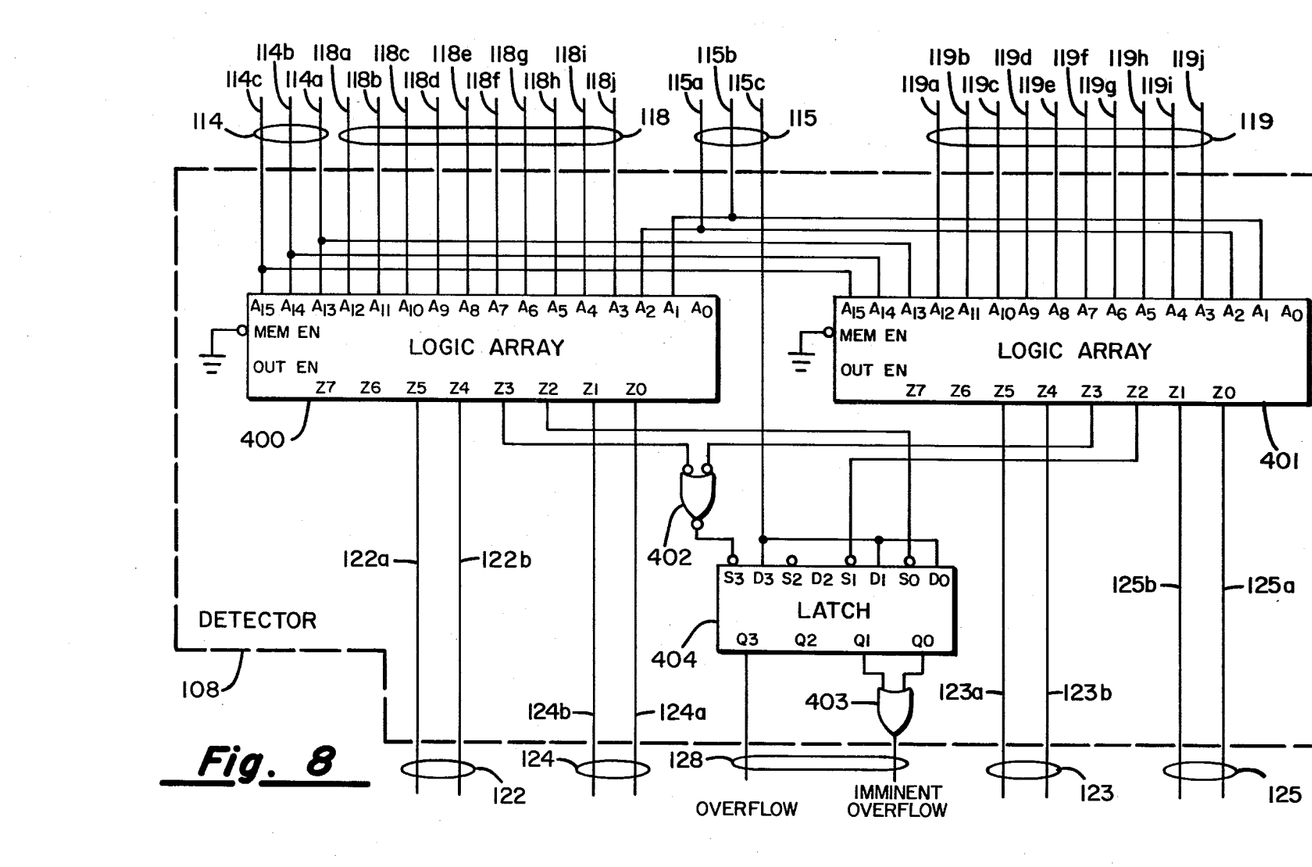
FIG. 8 is a detailed view of DETECTOR 108.

FIG. 3 shows the functional operation of the preferred embodiment which processes complex fixed point numbers. The imaginary portion is processed by IMAGINARY MULT/ACC 100, BUFFER 102, IMAGINARY SHIFTER 104, and IMAGINARY MUX 106. The real portion is processed by REAL MULT/ACC 101, BUFFER 103, REAL SHIFTER 105, and REAL MUX 107. As shown, the imaginary and real portions are processed in parallel. IMAGINARY MULT/ACC 100 and REAL MULT/ACC 101 are implemented with TRW Model TDC1003J. BUFFER 102 and BUFFER 103 are implemented with standard monolithic devices to provide 20 bits of buffering as required. IMAGINARY SHIFTER 104 and REAL SHIFTER 105 are implemented as shown in FIGS. 6 and 7, respectively. IMAGINARY MUX 106 and REAL MUX 107 are implemented as shown in FIGS. 5a and 5b, respectively. DETECTOR 108 is implemented as shown in FIG. 8.

Figure 4A:
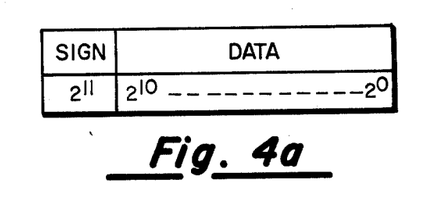
FIG. 4a shows the format of inputs to the multiplier/accumulators.
Figure 4B:
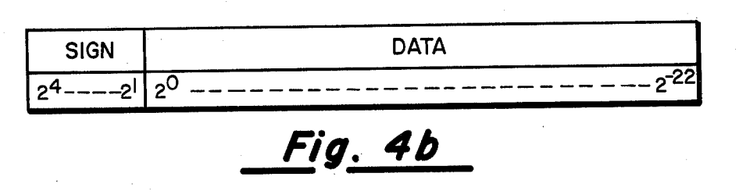
FIG. 4b shows the format of the output of the multiplier/accumulators.

FIG. 4a shows the format of data input to IMAGINARY MULT/ACC 100 via lines 110 and 112 and input to REAL MULT/ACC 101 via lines 111 and 113. FIG. 4b shows the format of data output from IMAGINARY MULT/ACC 100 via line 116 and from REAL MULT/ACC 101 via line 117. Notice that bit positions $2^0$-$2^{-22}$ provide 23 bits of data. The sign is normally found in bit position $2^1$ with bit positions $2^2$-$2^4$ providing three bits of sign overflow. BUFFER 102 and BUFFER 103 are implemented using industry standard part type 74S241. BUFFER 102 and BUFFER 103 buffer only 20 bits with the least significant seven data bits (i.e., bit positions $2^{-16}$-$2^{-22}$) being truncated.

Figure 4C:
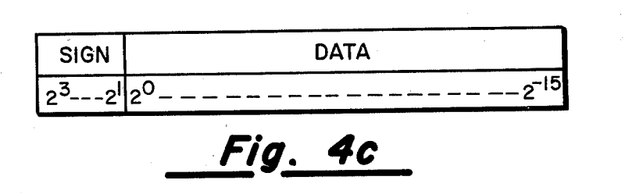
FIG. 4c shows the format of the input to the shifters.
Figure 4D:
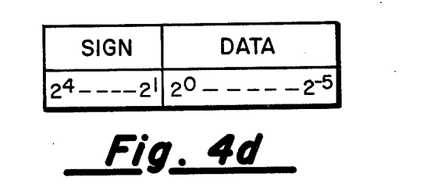
FIG. 4d shows the format of the input to the detector.

Referring again to FIG. 3, the output of BUFFER 102 is transferred to IMAGINARY SHIFTER 104 and DETECTOR 108 via line 118. The output of BUFFER 103 is transferred to REAL SHIFTER 105 and DETECTOR 108 via line 119. FIG. 4c shows the format of the 19 bits transferred to IMAGINARY SHIFTER 104 and REAL SHIFTER 105 via lines 118 and 119, respectively. FIG. 4d shows the format of the 10 bits transferred to DETECTOR 108 via lines 118 and 119. FIG. 4a shows the format of the 12 bits transferred via line 120, line 121, line 126, and line 127.

As shown in FIG. 3, DETECTOR 108 detects overflow and imminent overflow during processing of the imaginary portion by using the 10 bit quantity received from BUFFER 102 via line 118 and a three bit scale factor received via line 114. DETECTOR 108 controls IMAGINARY MUX 106 via lines 122 and 124. Overflow and imminent overflow conditions involving the real portion are detected by DETECTOR 108 using the 10 bit quantity received from BUFFER 103 via line 119 and the three bit scale factor received via line 114. REAL MUX 107 is controlled by DETECTOR 108 via lines 123 and 125. Line 128 contains two conductors. One conductor transfers an overflow signal generated as a result of an overflow condition involving either the imaginary portion or the real portion. The other conductor transfers an imminent overflow signal generated as a result of an imminent overflow condition involving either the imaginary portion or the real portion. Line 115 transfers detector control signals which are discussed further below. The enable data signal received via line 129 enables IMAGINARY MUX 106 and REAL MUX 107 to output imaginary data via line 126 and real data via line 127, respectively.

FIGS. 6 and 7 show the detailed implementation of IMAGINARY SHIFTER 104 and REAL SHIFTER 105, respectively. 4-BIT SHIFTERS 300, 301, 302, 303, 304, 305, 350, 351, 352, 353, 354, and 355 are industry standard part type 25S10. Table A shows the relationship between the conductors of lines 118 and 119 and the bit positions shown in FIG. 4c as input to IMAGINARY SHIFTER 104 and REAL SHIFTER 105, and the bit positions as shown in FIG. 4d as input to DETECTOR 108. Table B shows the relationship between the bit positions of FIG. 4a and the various conductors of lines 120 and 126. Table C shows the relationship between the bit portions of FIG. 4a and the various conductors of lines 121 and 127. As is seen in FIGS. 6 and 7, the imaginary portion and the real portion, respectively, are postscaled according to the eight possible and distinct values of the scale factor received via the three conductors of line 114 (i.e., lines 114a, 114b, and 114c).

FIGS. 5a and 5b show the detailed implementation of IMAGINARY MUX 106 and REAL MUX 107, respectively. QUAD MUX's 201, 202, 203, 251, 252, and 253 are implemented using industry standard part type 74S257.

TABLE A

| BIT POSITION | CONDUCTOR IMAGINARY | REAL |
|---|---|---|
| $2^4$ | 118a | 119a |
| $2^3$ | 118b | 119b |
| $2^2$ | 118c | 119c |
| $2^1$ | 118d | 119d |
| $2^0$ | 118e | 119e |
| $2^{-1}$ | 118f | 119f |
| $2^{-2}$ | 118g | 119g |
| $2^{-3}$ | 118h | 119h |
| $2^{-4}$ | 118i | 119i |
| $2^{-5}$ | 118j | 119j |
| $2^{-6}$ | 118k | 119k |
| $2^{-7}$ | 118l | 119l |
| $2^{-8}$ | 118m | 119m |
| $2^{-9}$ | 118n | 119n |
| $2^{-10}$ | 118o | 119o |
| $2^{-11}$ | 118p | 119p |
| $2^{-12}$ | 118q | 119q |
| $2^{-13}$ | 118r | 119r |
| $2^{-14}$ | 118s | 119s |
| $2^{-15}$ | 118t | 119t |

TABLE B

| BIT POSITION | CONDUCTOR IN | OUT |
|---|---|---|
| $2^{11}$ | 120a | 126a |
| $2^{10}$ | 120b | 126b |
| $2^9$ | 120c | 126c |
| $2^8$ | 120d | 126d |
| $2^7$ | 120e | 126e |
| $2^6$ | 120f | 126f |
| $2^5$ | 120g | 126g |
| $2^4$ | 120h | 126h |
| $2^3$ | 120i | 126i |
| $2^2$ | 120j | 126j |
| $2^1$ | 120k | 126k |
| $2^0$ | 120l | 126l |

TABLE C

| BIT POSITION | CONDUCTOR IN | OUT |
|---|---|---|
| $2^{11}$ | 121a | 127a |
| $2^{10}$ | 121b | 127b |
| $2^9$ | 121c | 127c |
| $2^8$ | 121d | 127d |
| $2^7$ | 121e | 127e |
| $2^6$ | 121f | 127f |
| $2^5$ | 121g | 127g |
| $2^4$ | 121h | 127h |
| $2^3$ | 121i | 127i |
| $2^2$ | 121j | 127j |
| $2^1$ | 121k | 127k |
| $2^0$ | 121l | 127l |

FIG. 8 shows the detailed implementation of DETECTOR 108. LOGIC ARRAY 400 and LOGIC ARRAY 401 are SIGNETICS part type 82S100. The manufacturer provides instructions in how to program the LOGIC ARRAY.

Figure 9:
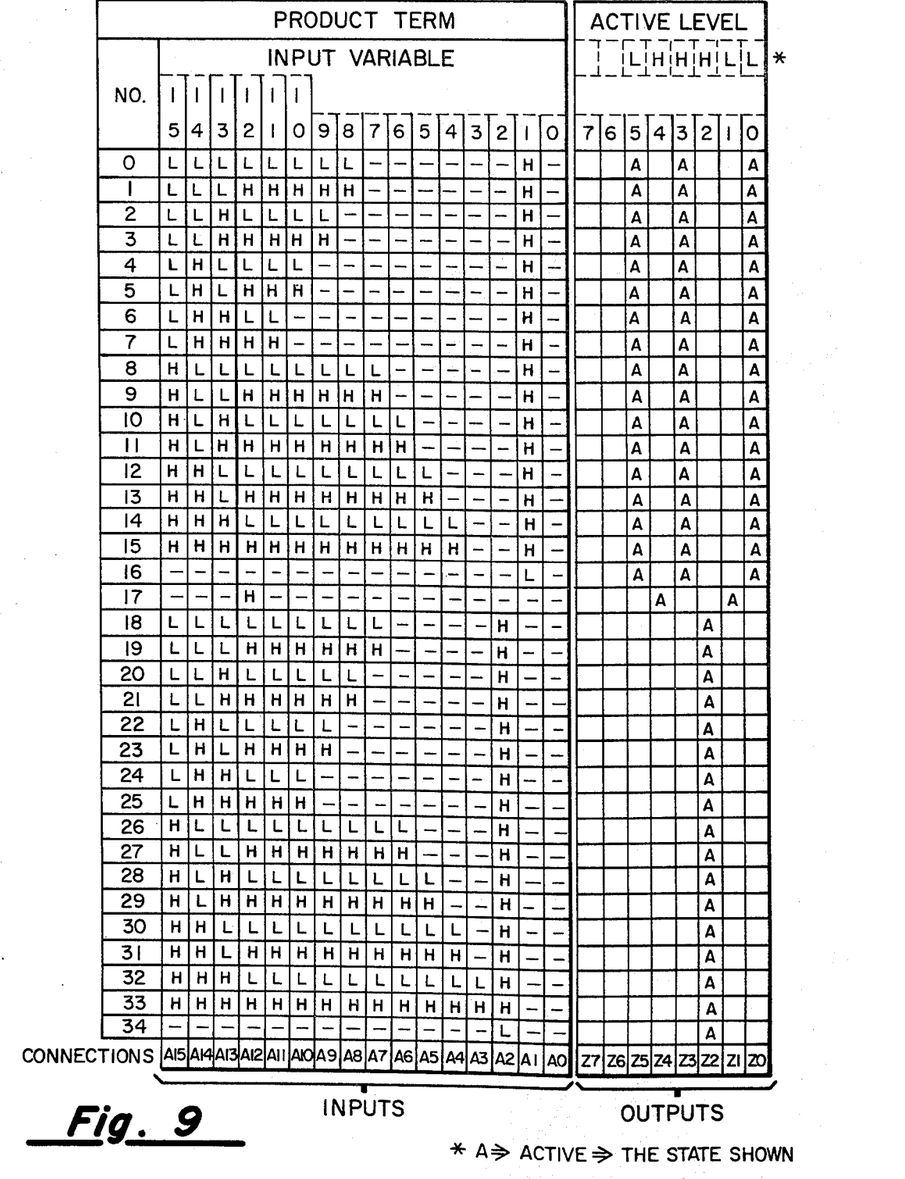
FIG. 9 is a table showing the inputs and outputs of the programmable logic arrays.

FIG. 9 provides the program required to be entered into each (i.e., LOGIC ARRAY 400 and LOGIC ARRAY 401). Referring again to FIG. 8, LATCH 404 is industry standard part type 9314. As can be seen, line 128 indicates whether there is an overflow condition involving the imaginary portion or the real portion and whether there is an imminent overflow condition involving the imaginary portion or the real portion.

Line 115 contains three conductors which control the operation of DETECTOR 108. As can be seen in FIG. 8, line 115c supplies a clear signal to LATCH 404. The clear signal is used by the system controller to clear LATCH 404 from any previous overflow or imminent overflow conditions. Lines 115a and 115b are the enable/disable imminent overflow and overflow detection, respectively. The system controller uses lines 115a and 115b to enable/disable detection. In the preferred embodiment, the system controller is a microprogrammed device having a 120 bit microinstruction word. In this application, the state of lines 115a and 115b are determined by bits $2^9$ and $2^{10}$ of the microinstruction word. However, lines 115a, 115b, and 115c may be set or cleared by other means including manual switches.

Referring again to FIG. 9, the various detection conditions can be observed. Note at condition No. 16, input connection A1 is low. This corresponds to a low on line 115b (see also FIG. 7). This condition disables overflow detection making Z0, Z3, and Z5 active. From FIG. 9 it is seen that Z0 and Z5 are low and Z3 is high. Therefore, from FIG. 8 it can be seen that the bit position of LATCH 404 corresponding to overflow (i.e., Q3) cannot be set via gate 402 and no overflow condition will be detected. Furthermore, lines 122a, 124a, 123a, and 125a will be forced low causing IMAGINARY MUX 106 (see also FIG. 5a) and REAL MUX 107 (see also FIG. 5b) to select the data received from IMAGINARY SHIFTER 104 via line 120 and from REAL SHIFTER 105 via line 121, respectively. Similarly, condition No. 34 of FIG. 9 shows a low on input connection A2. From FIG. 8 this can be seen to be a disable imminent overflow detection condition causing output connection Z2 to be active (i.e., high). This condition prevents the imminent overflow bit positions (i.e., Q0 and Q1) of LATCH 404 from being set.

Condition No. 17 of FIG. 9 shows that whenever input connection A12 (i.e., lines 118a or 119a) is high, corresponding to sign bit position $2^4$ set (see Table A and FIG. 4d), connections Z1 and Z4 are active, making Z1 low and Z4 high. This signifies that a negative quantity is present. A $-1$ rather than a $+1$ is presented to IMAGINARY MUX 106 via lines 122b and 124b and to REAL MUX 107 via lines 123b and 125b. Reference to FIG. 5a will show that if line 122b is high and line 124b is low, the D1 input of QUAD MUX 201 will be one and all other inputs of QUAD MUX 201 and all inputs of QUAD MUX 202 and QUAD MUX 203 are zero signifying $-1$. Reference to FIG. 5b shows the corresponding result for REAL MUX 107 as a result of line 123b high and line 125b low.

Condition No.'s 18-33 of FIG. 9 show the operation of the imminent overflow detector when enabled (i.e., input connection A2 high). Notice that Z2 is active (i.e., high) and no imminent overflow can occur for the combinations of scale factor (i.e., input connections A13, A14, and A15) and input connections A3-A12 shown. Any other combination of scale factor and input connections A3-A12 is detected as an imminent overflow causing Z2 to be low and setting the appropriate (i.e., either Q0 or Q1) position of LATCH 404. See also FIG. 8.

Condition No.'s 0-15 of FIG. 9 similarly show the operation of the overflow detector as enabled by the high at input connection A1. For each of the conditions shown (i.e., condition No.'s 0-15) no overflow condition is present causing Z0, Z3, and Z5 to be active as explained above. For all other conditions, an overflow is detected causing output connections Z0 and Z5 to be high and output connection Z3 to be low. As seen in FIG. 8, if Z3 of either LOGIC ARRY 400 or LOGIC ARRAY 401 is low, bit position Q3 of LATCH 404 is set by gate 402. Furthermore, IMAGINARY MUX 106 and REAL MUX 107 are caused to select a $\pm 1$ for output, because lines 122a and 124a, or 123a and 125a, are high. Referring again to FIG. 5a, if lines 122a and 124a are high, QUAD MUX 201, QUAD MUX 202, and QUAD MUX 203 select the inputs presented at A1, B1, C1, and D1. These inputs are received via lines 122b and 124b and are determined by DETECTOR 108 as explained above. Reference to FIG. 5b will show that lines 123a and 125a similarly cause REAL MUX 107 to select the inputs received via lines 123b and 125b.

One can readily verify the existence of overflow conditions or imminent overflow conditions not present in FIG. 9. The preferred embodiment uses specific design parameters which may readily be modified by those skilled in the art to utilize the present invention within other applications.

What is claimed is:

1. In a digital processor, having an arithmetic unit, and having means for supplying a scale factor for scaling a resultant produced by said arithmetic unit, an apparatus for postscaling said resultant comprising:
    a shifter means responsively coupled to said arithmetic unit and said supplying means for shifting said resultant a number of radix places corresponding to said scale factor supplied by said supplying means;
    a detector means responsively coupled to said supplying means and said arithmetic unit for generating an overflow signal whenever said scale factor causes said shifter to shift said resultant a number of radix places causing an overflow condition; and
    means responsively coupled to said shifter means and said detector means for forcing the output of said shifter means to a predetermined value whenever said detector means detects an overflow condition.

2. An apparatus according to claim 1 wherein said detector further comprises:
    means responsively coupled to said supplying means and said arithmetic unit for generating an imminent overflow signal whenever said scale factor causes said shifter to shift said resultant a number of radix places causing an imminent overflow condition.

3. An apparatus for arithmetic processing comprising:
    multiply-accumulate circuit means for generating a resultant from the arithmetic manipulation of an input;
    means for supplying a scale factor;
    shifter means responsively coupled to said multiply/accumulate circuit means and said supplying means for shifting said resultant a number of radix places corresponding to said scale factor;
    detector means responsively coupled to said supplying means and said multiply/accumulate circuit means for determining whether an overflow condition exists as a result of said shifter means shifting said resultant said number of radix places corresponding to said scale factor; and
    means responsively coupled to said detector means and said shifter means for forcing an output of said shifter means to a predetermined maximum absolute value whenever said detector means determines that said overflow condition exists.

4. An apparatus according to claim 3 wherein said detector means further comprises:
circuit means responsively coupled to said supplying means and said multiply/accumulate circuit means for determining that an imminent overflow condition exists.

* * * * *